(12) United States Patent
Shepherd (10) Patent No.: US 6,237,904 B1
(45) Date of Patent: May 29, 2001

(54) MOTION STABILIZER (76) Inventor: John D. Shepherd, 13822 Bruns Rd., Manhattan, IL (US) 60442

( * ) Notice: Subject to any disclaimer, the term of this patent is extended or adjusted under 35 U.S.C. 154(b) by 0 days.

(21) Appl. No.: 09/311,826

(22) Filed: May 13, 1999

Related U.S. Application Data (63) Continuation-in-part of application No. 09/248,201, filed on Feb. 10, 1999, now Pat. No. 6,126,154.

(51) Int. Cl.$^7$ .......................................... F16F 1/00
(52) U.S. Cl. .............................. 267/150; 267/34; 267/221
(58) Field of Search .......................... 267/256, 34, 64.26, 267/66, 67, 68, 69, 71, 121, 150, 169, 170, 221, 286, 291

(56) References Cited

U.S. PATENT DOCUMENTS

| 1,223,573 | 4/1917 | Eldredge . | |
|---|---|---|---|
| 4,406,473 | 9/1983 | Sexton . | |
| 4,736,931 | * 4/1988 | Christopherson | 267/34 |
| 4,822,012 | 4/1989 | Sketo . | |
| 5,454,550 | * 10/1995 | Christopherson | 267/221 |

OTHER PUBLICATIONS

Industrial Gas Springs Inc. Brochure Apr. 1997.
Safe–T–Plus Brochure Nov. 1997.

* cited by examiner

Primary Examiner—Robert J. Oberleitner
Assistant Examiner—Pamela J. Rodriguez
(74) Attorney, Agent, or Firm—Mason, Kolehmainen, Rathburn & Wyss; Philip M. Kolehmainen

(57) ABSTRACT

A motion stabilizer for yieldingly urging a relatively movable load member toward a normal or centered position relative to another load member includes a telescoping body that shortens (retracts) as the load members move toward one another and lengthens (extends) as the load members move apart. A reaction unit is mounted within an axially extending internal chamber defined within the body. The reaction unit has a normal length and a displaced length. The reaction unit may include a spring such as a gas spring or coil spring, and the spring may operate in compression or in expansion. The reaction unit may provide damping. Depending of the characteristics of the reaction unit, the displaced length may be either longer or shorter than the normal length. The telescoping members of the body are constructed and arranged to displace the reaction unit away from the normal length and in the same direction toward the displaced length in response to both lengthening and shortening of the body, providing a stroke doubling effect.

16 Claims, 5 Drawing Sheets

MOTION STABILIZER

CROSS REFERENCE TO RELATED APPLICATION

This application is a continuation-in-part of U.S. application Ser. No. 09/248,201 filed on Feb. 10, 1999, now U.S. Pat. No. 6,126,154.

BACKGROUND OF THE INVENTION

The present invention relates to motion stabilizers, and more particularly to devices including a spring and a telescoping body assembly for yieldingly holding a load in a normal or centered position.

There is a long standing need for a stabilizer for stabilizing the movement of a load that is movable relative to another load or a relatively fixed support. Such a stabilizer should yieldingly hold the load in a normal position. In may instances the normal position is a centered position in a range of movement of the load. The stabilizer should include a reaction unit having a spring acting through a body assembly to permit the load to be displaced from the normal position and to resiliently bias the load to return from the displaced position back toward the normal position.

There are numerous and varied applications for a motion stabilizer of this kind. One example of an application exhibiting such a need is the steering system of a large vehicle such as a truck or recreational vehicle. In this application, the motion stabilizer urges the steering gear toward a normal or centered position in which the vehicle travels straight ahead, and permits the steering gear to be displaced so that the vehicle can be turned. In a vehicle application, a motion stabilizer should be able to hold the vehicle under control in the presence of cross winds, road irregularities, tire blow outs and the like. Other applications for motion stabilizers include conveyors and manufacturing equipment, power boats, vehicles of many types and trailer hitch systems. A motion stabilizer can provide advantages in many situations where a movable load must be yielding held in a centered or normal position.

Many stabilizing or centering systems have been developed or proposed in the past. For example, U.S. Pat. Nos. 1,223,573 and 4,406,473 disclose vehicle steering stabilizer systems using a pair of coil springs urging a component of the vehicle steering linkage toward a centered or normal position. In another example, U.S. Pat. No. 4,822,012 discloses a bidirectional steering stabilizer having a single spring and a damper for yieldably biasing the wheels of a vehicle toward a straight ahead direction. Although these systems are relatively simple in that they are mechanical devices with relatively few parts, they suffer from disadvantages including interfering with the operator's ability to control the vehicle in a natural way, and a lack of the ability to accommodate a variety of types of springs and reaction units and the ability to easily adjust the stabilizer to match the requirements of a particular vehicle or application.

Another approach that has been used in the past is to provide a complex hydraulic and pneumatic system for assisting the power steering system of a large vehicle in holding the steering linkage and wheels on center. One example of a system of this type is the Howard Power Center Steering System sold by River City Products, Inc. of San Antonio, Tex. Although this steering control system performs well, it is subject to the disadvantages of complexity and large expense, and it is not easily adaptable to a variety of differing applications.

SUMMARY OF THE INVENTION

A principal object of the present invention is to provide an improved motion stabilizer for controlling relative movement of two relatively movable loads. Other objects are to provide a motion stabilizer including a spring and a telescoping body assembly for yieldingly urging a load member toward a normal or centered position; to provide a motion stabilizer that can extend the utility of a reaction unit such as a gas spring by doubling its stroke and providing a two-way action; to provide a motion stabilizer that can accommodate many types of reaction units such as compression or extension springs of several types, dampers and combinations of springs and dampers; to provide a motion stabilizer that can be tailored to optimize the operating characteristics required for many different applications such as vehicle steering systems and industrial applications; to provide a motion stabilizer that is bidirectional and symmetrical in operation; and to provide a motion stabilizer overcoming disadvantages of motion stabilizing and centering systems used in the past.

In brief, in accordance with the invention there is provided a motion stabilizer for controlling motion between first and second relatively movable load members. The motion stabilizer includes an elongated body assembly defining an axially extending internal chamber. The body assembly includes axially spaced first and second attachment members for connection to the load members. A reaction unit is captured within the chamber and has an axial length that varies between first and second lengths. The body assembly has an axial length variable in response to relative motion of the attachment members. The body assembly has a normal position in which the reaction unit has the first length and in which the attachment structures are separated by a predetermined distance. The body assembly includes means for varying the axial length of the reaction unit from the first length toward the second length in response to relative axial movement of the attachment structures in either axial direction from the normal position. The body assembly includes at least a radially inner body member and a radially outer telescoped body member, the body members being axially movable relative to one another. The radially inner body member defines at least part of the chamber and has a force transfer portion engageable with the reaction unit. The inner body member includes an elongated axial opening proving access from the chamber to the radially outer body member. The reaction unit includes a force transfer portion extending radially from the chamber through the axial opening for engagement with the radially outer body member.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
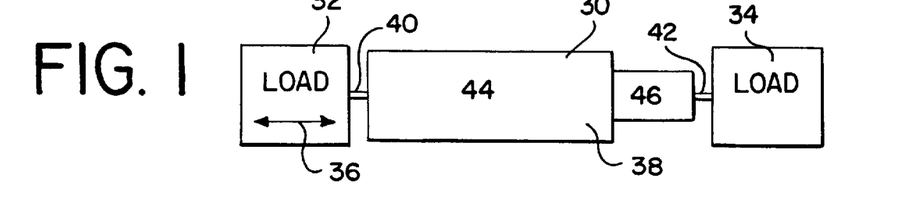
FIG. 1 is a schematic illustration of a motion stabilizer constructed in accordance with the present invention used to control the relative motion of a pair of load members.

FIG. 1 of the drawings illustrates a motion stabilizer 30 constructed in accordance with the present invention used for controlling the relative motion of first and second load members 32 and 34. As seen in FIG. 1, the load members 32 and 34 are in a normal or centered position. As indicated by the arrow 36, the load 32 is movable away from the normal position relative to the load 34, either toward or away from the load 34. This movement either decreased or increases the distance between the loads 32 and 34. The motion stabilizer 30 includes an elongated, telescoped body 38 and a pair of attachment members 40 and 42 for attaching the motion stabilizer 30 to the loads 32 and 34. The motion stabilizer 30 is capable of shortening or lengthening as the loads 32 and 34 move relative to one another, and the motion stabilizer 30 in accordance with the invention applies to the loads 32 and 34 a force tending to yieldingly return the loads to their normal position seen in FIG. 1.

Figure 2:
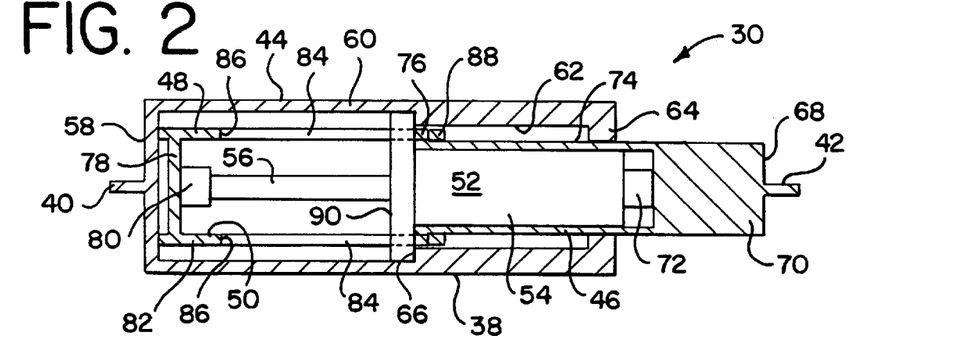
FIG. 2 is a simplified and partly schematic illustration of the motion stabilizer of FIG. 1 in its normal or centered position.
Figure 3:
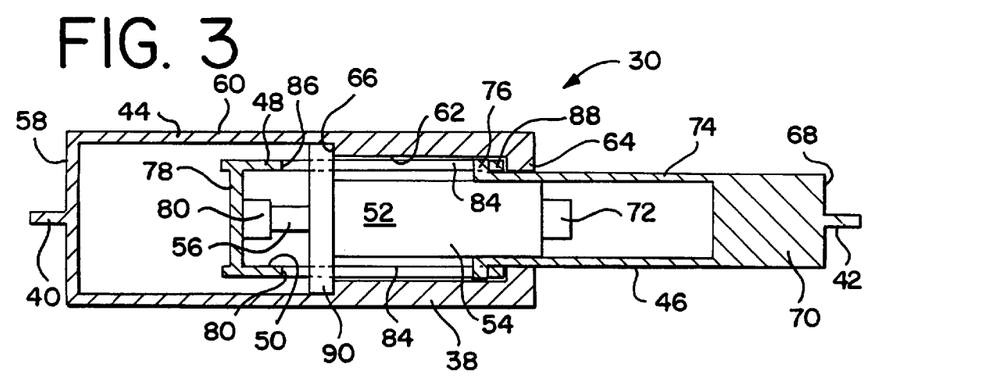
FIG. 3 is a view similar to FIG. 2 showing the motion stabilizer of FIG. 2 in an extended position.
Figure 4:
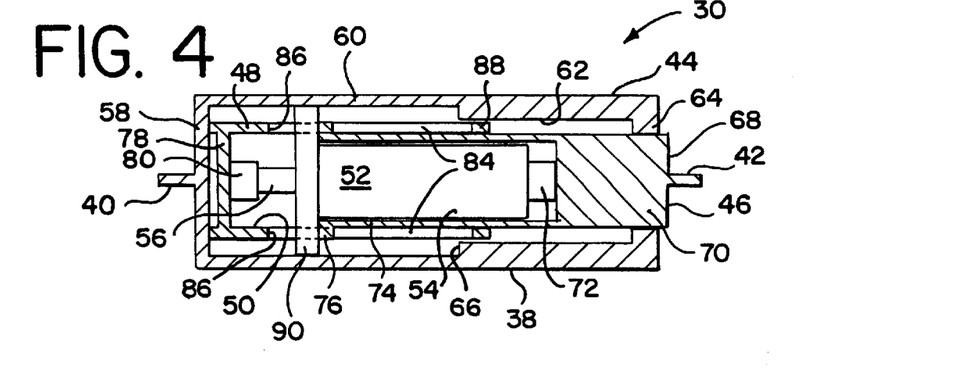
FIG. 4 is a view similar to FIG. 2 showing the motion stabilizer of FIG. 2 in a retracted position.

The principal functional components of the motion stabilizer 30 are shown in simplified, schematic fashion in FIGS. 2–4. The body 38 includes an outside body 44 carrying the attachment member 40 and an inside body 46 carrying the attachment member 42. Within the outside body 44 and partly surrounding the inside body 46 is an inner force transfer body 48. An elongated, axially extending internal chamber 50 is defined within the body 38. The chamber 50 is unobstructed and is coaxial with the body 38.

A reaction unit 52 is supported within the chamber 50. The reaction unit 52 includes a housing 54 and a projecting stem 56, and in a preferred embodiment of the invention a spring within the housing 54 biases the stem to a normal, extended position seen in FIG. 2. The axial length of the reaction unit 52 can be changed if a force applied between the housing 54 and stem 56 retracts the stem 56 into the housing 54 (FIG. 3 or 4) and in this case the spring within the housing 54 urges the stem back to the normal position.

The outside, inside and force transfer bodies 44, 46 and 48 are telescoped together for axial sliding movement. The outside body 44 includes an end wall 58 carrying the attachment member 40 and an axially extending tubular side wall 60 having an inwardly enlarged portion 62 and a collar portion 64. The end of the enlarged portion 62 opposite the collar 64 defines a drive shoulder 66.

The inside body 46 includes an end wall 68 carrying the attachment member 42 and an axially extending spacer segment 70. Spacer segment 70 can contact a bumper 72 carried by the reaction unit housing 54. A tubular side wall 74 extends axially from the spacer segment 70 through an opening in the collar portion 64 of the outside body 44. The end of the side wall 74 terminates in a radially outwardly extending collar 76 that is slideably received within the enlarged portion 62 of the outside body 44.

The inner force transfer body 48 is located within the outside body 44 and includes an end wall 78 that can abut against the end wall 58 of the outside body 44. The end wall 78 also can contact a bumper 80 carried by the stem 56 of the reaction unit 52. A side wall 82 of the force transfer body 48 is defined by axially extending body portions 84 defining a pair of elongated axially extending openings 86 communicating with the internal chamber 50. The end of the side wall 82 terminates in a collar 88 that overlies the collar 76 of the inside body 46. The side wall 82 of the force transfer body 48 is axially slidable within the enlarged portion 62 of the outside body 44. The collar 64 of the inside body 46 is apertured to slideably receive the body portions 84 of the force transfer body 48.

The outside, inside and force transfer bodies 44, 46 and 48 are slideably related to permit the axial length of the body 28 to increase when the loads 32 and 34 move apart and to decrease when the loads 32 and 34 move together. When the attachment members 40 and 42 move apart (compare FIG. 2 with FIG. 3), the side wall 74 of the inside body 46 slides within the collar 64 of the outside body 44, the collar 76 of the inside body 46 slides within the enlarged portion 62 of the outside body 44, and the collar 76 of the inside body 46 contacts the collar 88 of the force transfer body 48 causing it to move together with the inside body 46 as the side wall 82 of the force transfer body 48 slides within the enlarged portion 62 of the outside body 44. When the attachment members 40 and 42 move toward one another (compare FIGS. 2 and 4), the side wall 74 of the inside body 46 slides within the collar 64 of the outside body 44, and the collar 76 slides along the axially extending openings 86 defined between the body portions 84 of the force transfer body 48.

The housing 54 of the reaction unit 52 includes a radially outwardly extending portion 90 that extends from the internal chamber 50 through the axially extending openings 86 of the inner force transfer body to the outside body 44 where it can contact the drive shoulder 66 of the outside body 44. The portion 90 is axially slidable relative to the force transfer body 48 and can be contacted by the collar 76 of the inside body 46.

In operation of the motion stabilizer 30 as seen in FIGS. 1–4, a normal position is seen in FIG. 2. The normal position may also be referred to as a centered position in those applications where the normal position is at the center of a range of relative movement of the loads 32 and 34. In the normal position of FIG. 2, the stem 56 is extended, the bumper 72 contacts the end of the spacer segment 70 of the inside body 46, the bumper 80 contacts the end wall 78 of the force transfer body 48, and the end wall 78 of the force transfer body 48 contacts the end wall 58 of the outside body 44. In the illustrated normal position, there is no space between these contacting elements and there is no slack in the normal position. If a zone of free motion or slack is desired around the normal or centered position, then space is introduced, for example adjacent the bumpers 72 and 80.

The reaction unit may be in its fully extended condition (against a hard internal stop for example) in the normal position seen in FIG. 2. If a preloaded condition is desired, the parts are positioned and sized so that in the extended condition of FIG. 2, the stem 56 is not fully extended relative to the reaction unit housing 54. In this case, the initial force required to move the stem is increased. The force characteristics may also be varied by choice of material of one or both of the bumpers 72 and 80. A rigid metal may be used to provide a stiff or hard effect while a soft elastomeric material may be used to provide a softer action.

When the loads 32 and 34 move apart from the normal position the motion stabilizer 30 becomes longer and when the loads 32 and 34 move toward one another from the normal position the motion stabilizer 30 becomes shorter. In either case, when the length of the motion stabilizer 30 either increases or decreases, the body 28 acts to move the stem 56 of the reaction unit from its extended position and into the housing 54 thereby to shorten the axial length of the reaction unit.

More specifically, when the axial length of the motion stabilizer 30 increases (compare FIGS. 2 and 3), the drive shoulder 66 of the outer housing 44 engages and applies a force to the radially outwardly extending portion 90 of the housing 54 of the reaction unit 52. Simultaneously, the collar 76 of the inside body 46 engages the collar 88 of the force transfer body 48, and the end wall 78 of the force transfer body 48 engages and applies an equal and opposite force to the bumper 80 carried by the stem 56 of the reaction unit 52. As a result the stem 56 is forced into the housing 54. In a preferred arrangement the result is that compression of a spring within the housing 54 results in an increasing force that urges the stem outward, back toward its extended position.

When the axial length of the motion stabilizer 30 decreases (compare FIGS. 2 and 4), the end wall 58 of the outer housing 44 acts through the end wall 78 of the force transfer body 48 and applies a force to the bumper 80 carried by the stem 56 of the reaction unit 52. Simultaneously, the spacer portion 70 of the inside body 46 applies an equal and opposite force to the bumper 72 carried by the housing 54 of the reaction unit 52. As a result the stem 56 is forced into the housing 54. In a preferred arrangement the result is that compression of a spring within the housing 54 results in an increasing force that urges the stem outward, back toward its extended position.

The reaction unit 52 is compressed or axially shortened from its normal axial length when the length of the motion stabilizer 30 either increases or decreases from its normal or centered length. The working stroke of the reaction unit is in effect doubled because its stroke is used to provide a return force in a bilateral fashion. This stroke doubling effect is useful in applications where a load can move in two directions from a normal or centered position.

Figure 5:
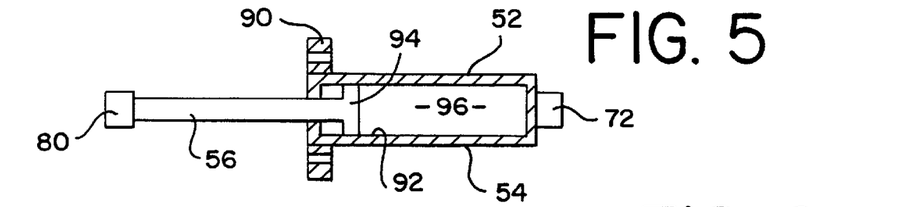
FIG. 5 is a simplified schematic illustration of the reaction unit of the motion stabilizer of FIGS. 1–4 wherein the reaction unit includes a gas spring.

A preferred gas spring reaction unit 52 is shown in simplified form in FIG. 5. The housing 54 defines a cylinder 92 and the stem 56 carries a piston 94 movable in the cylinder 92. A compressible gas such as nitrogen is trapped within a region 96. When the stem 56 is forced into the housing 54, the volume of region 96 is decreased and gas is compressed in the region 96. The energy stored in the compressed gas applies a reactive return force biasing the stem back to its extended position. Gas springs operating in this fashion are known, and examples useful for vehicle steering systems as well as other applications are identified in copending U.S. patent application Ser. No. 09/248,201 filed on Feb. 10, 1999, now U.S. Pat. No. 6,126,754, incorporated herein by reference.

Figure 6:
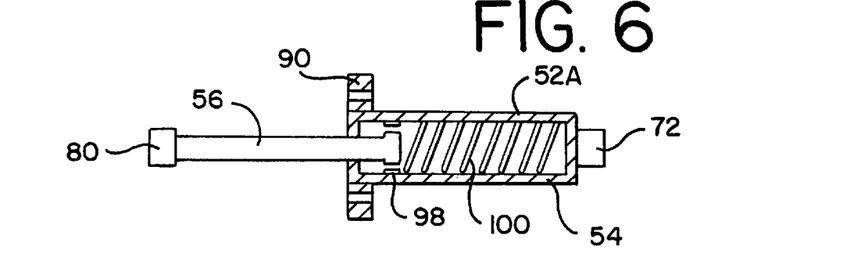
FIG. 6 is a simplified schematic illustration of an alternative reaction unit wherein the reaction unit includes a coil spring.

As illustrated in FIGS. 6–9, the present invention can employ many different types of reaction units. FIG. 6 shows a compression spring reaction unit 52A. Stem 56 terminates in a head 98 slidable within the housing 54. A compression coil spring 100 is positioned between the head 98 and the closed end of the housing 54. When the stem 56 is forced into the housing 54, the coil spring 100 is compressed and the energy stored in the compressed spring 100 applies a reactive return force biasing the stem back to its extended position.

Figure 7:
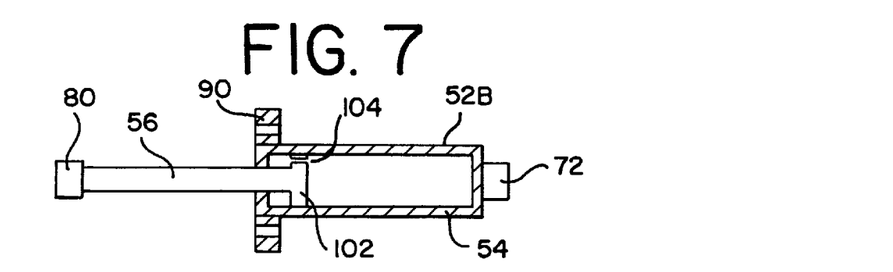
FIG. 7 is a simplified schematic illustration of an alternative reaction unit wherein the reaction unit includes a damper.

FIG. 7 shows a damping reaction unit 52B. Stem 56 terminates in a piston 102 having a restricted orifice 104. The housing 54 is filled with a fluid such as air or other gas or a suitable liquid or mixture of liquid and gas. When the piston 102 moves within the housing 54, the motion is resisted by restricted flow through the orifice 104, thus damping axial motion of the stem 56 in the housing 54. When the motion stabilizer 30 is supplied with the damping reaction unit 52B, the motion stabilizer does not provide a reactive force tending to return the loads 32 and 34 to their normal position. Instead, in this application, the motion stabilizer 30 provides a reactive controlled damping force, and this force is applied over a range of movement that is effectively twice the range of movement of the cylinder and damping piston alone.

Figure 8:
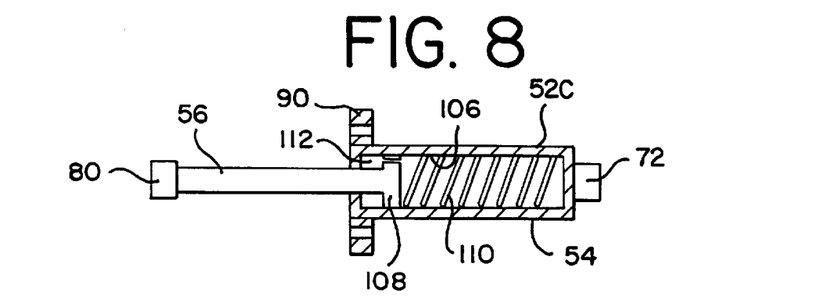
FIG. 8 is a simplified schematic illustration of an alternative reaction unit wherein the reaction unit includes a coil spring and a damper.

FIG. 8 shows a reaction unit 52C combining spring and damping actions. The housing 54 defines a cylinder 106 that is filled with a suitable damping fluid. The stem 56 terminates in a piston 108 axially movable in the cylinder 106. A coil spring 110 is interposed between the piston 108 and the opposed end wall of the body 54. A restricted orifice 112 is formed in the piston 108. When the stem 56 is forced into the housing 54, the coil spring 110 is compressed and the energy stored in the compressed spring 110 applies a reactive return force biasing the stem back to its extended position. Simultaneously, the motion of the piston 108 and stem 56 relative to the housing 54 is damped by the restricted flow of fluid through the orifice 112.

There are many known devices that provide a combination of spring and damping reactive forces and that can be used as reaction units in a motion stabilizer in accordance with the present invention. For example, gas springs having both gas spring characteristics and damping characteristics are available from companies including Industrial Gas Springs Inc. of Newtown Square, Pa. Shock absorber assemblies having both spring and damping characteristics are available from companies including Gabriel Ride Control Products, Inc., 100 Westwood Place, Brentwood, Tenn. 37027. An advantage of the motion stabilizer of the present invention is that the unobstructed cylindrical elongated internal chamber such as the chamber 50 of the motion stabilizer 30 can accommodate these and other available devices that can serve as reaction units with little or no modification. This adds to the versatility of motion stabilizers incorporating features of the present invention and augments their ability to be matched or tailored to the requirements of many different applications.

Figure 9:
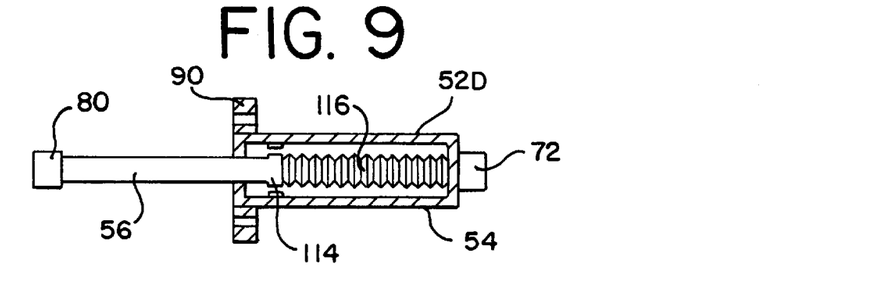
FIG. 9 is a simplified schematic illustration of an alternative reaction unit wherein the reaction unit includes an elastomeric spring.

FIG. 9 shows an elastomeric spring reaction unit 52D. Stem 56 terminates in a head 114 slidable within the housing 54. A compressible elastomeric body 116 of rubber or similar material is positioned between the head 114 and the closed end of the housing 54. When the stem 56 is forced into the housing 54, the body 116 is compressed and the energy stored in the compressed body 116 applies a reactive return force biasing the stem back to its extended position. As will appear below in connection with FIGS. 26–28, expansion springs as well as compression springs can be used in reaction units for motion stabilizers of the present invention. Elastomeric springs having characteristics like rubber bands are suitable for such applications.

Figures 10, 11:
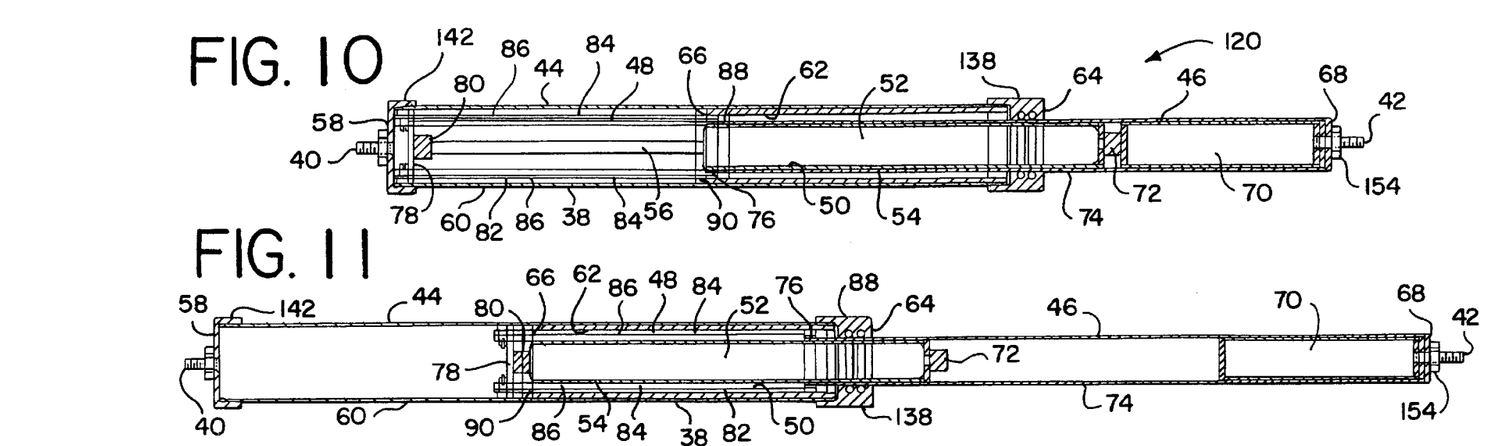
FIG. 10 is an axial sectional view of a motion stabilizer constructed in accordance with the invention and corresponding to the simplified and partly schematic illustration of FIG. 2.
FIG. 11 is a view similar to FIG. 10 showing the motion stabilizer of FIG. 10 in an extended position.
Figures 12, 13, 14, 15:
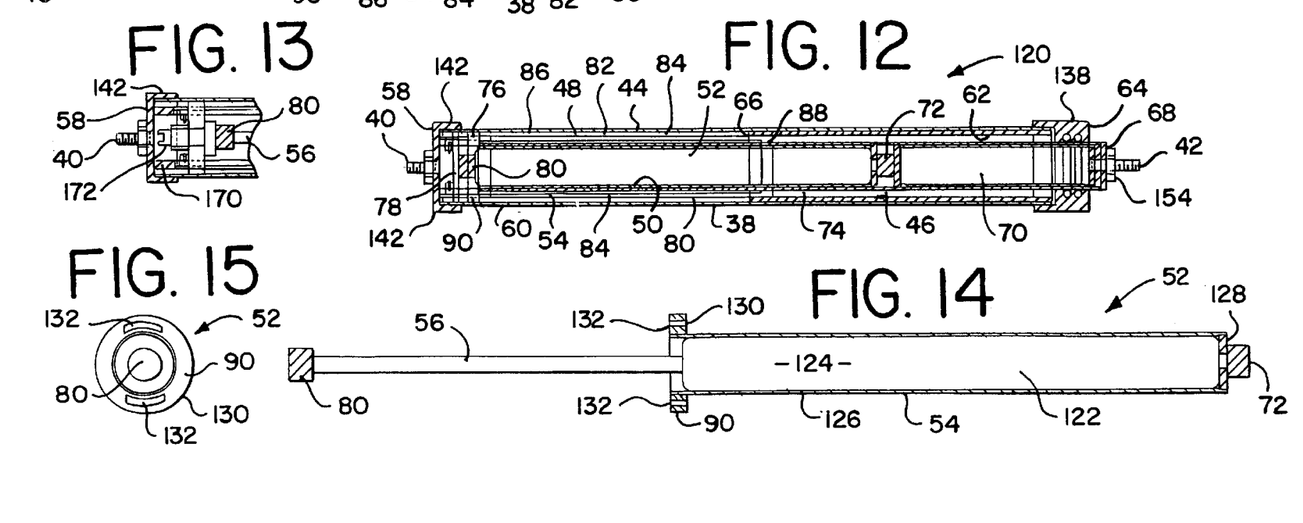
FIG. 12 is a view similar to FIG. 10 showing the motion stabilizer of FIG. 10 in a retracted position.
FIG. 13 is a fragmentary sectional view similar to the left hand portion of FIG. 10 illustrating an alternative form of the motion stabilizer of FIGS. 10–12 wherein preload or slack is adjustable.
FIG. 14 is an enlarged axial sectional view showing the reaction unit of the motion stabilizer of FIGS. 10–12.
FIG. 15 is an end view of the reaction unit of FIG. 14

FIGS. 10–12 illustrate a preferred motion stabilizer 120 that can be constructed as a practical embodiment of the invention seen in schematic and simplified form in FIGS. 1–4. FIG. 10 illustrates the normal or centered position seen in FIG. 2, FIG. 11 illustrates the extended position seen in FIG. 3 and FIG. 12 illustrates the retracted position seen in FIG. 4. Because the motion stabilizers 30 and 120 are the same except for the level of detail illustrated and because they operate in the same manner, the same reference characters are used for corresponding elements and the description of the elements and their operation is not repeated.

FIGS. 14–24 illustrate details of construction of the motion stabilizer 120. The reaction unit 52 is seen in FIGS. 14 and 15. A conventional gas spring assembly 122 includes an elongated cylindrical body 124 from which the stem 56 extends. For example the gas spring assembly 122 may be a 150 pound spring force Model No. 101-6-14-72-T-150 or a 270 pound spring force Model No. 101-6-14-72-T-270 available from Industrial Gas Springs, Inc. of 4615 West Chester Pike, Newtown Square, Pa. The body 124 is received in a container tube 126 having an end cap 128 supporting the bumper 72. The radially outwardly extending portion 90 is a disk 130 secured to the open end of the tube 126. The disk includes an opposed pair of arcuate apertures 132 for slideably receiving the axially extending body portions 84 of the inner force transfer body 48.

Figures 16, 17, 18:
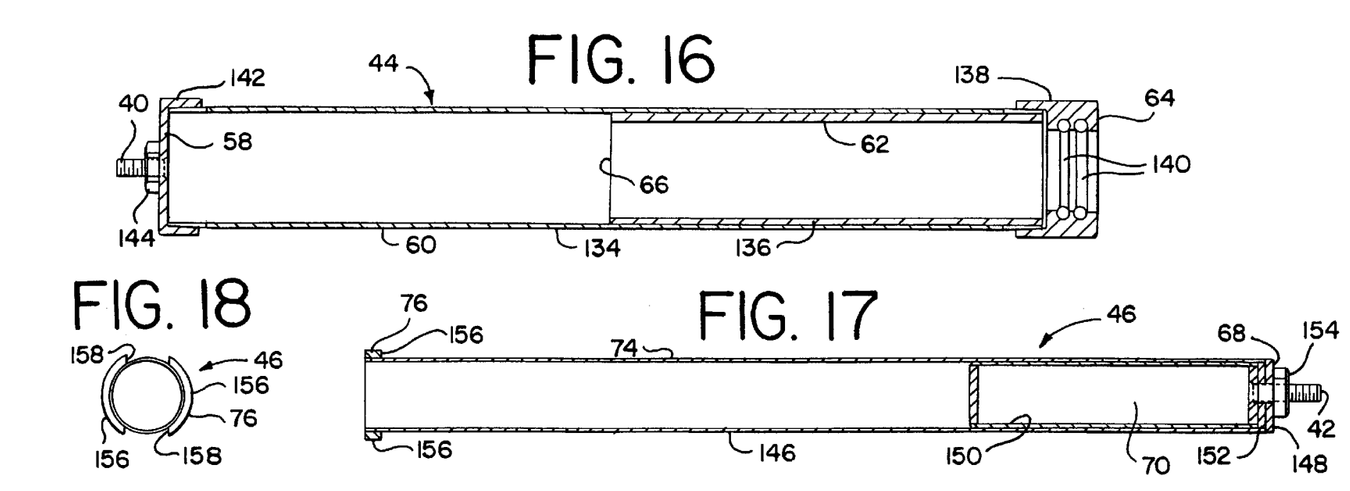
FIG. 16 is an enlarged axial sectional view showing the outside body of the body of the motion stabilizer of FIGS. 10–12.
FIG. 17 is an enlarged axial sectional view showing the inside body of the body of the motion stabilizer of FIGS. 10–12.
FIG. 18 is an end view of the inside body of FIG. 17.
Figure 19:
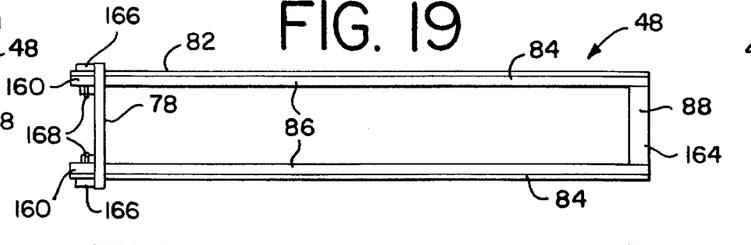
FIG. 19 is an enlarged side view showing the inner force transfer body of the body of the motion stabilizer of FIGS. 10–12.
Figure 20:
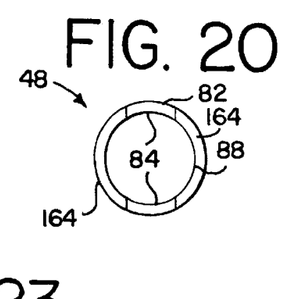
FIG. 20 is an end view of the right end of the inner force transfer body of FIG. 19.
Figures 21, 22:
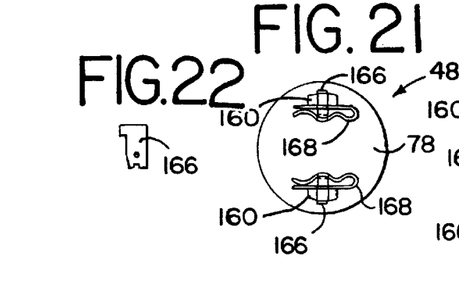
FIG. 21 is an end view of the left end of the inner force transfer body of FIG. 19
FIG. 22 is a further enlarged elevational view of a bar retaining clip of the force transfer body of FIG. 19.

FIG. 16 illustrates details of construction of the outside body 44. The side wall 74 is formed by a tube 134. The inwardly enlarged portion is a tube 136 secured within the tube 134 and the end of the tube 136 forms the drive shoulder 66. A cap 138 is threaded onto the end of the tube 134 to provide the collar 64. O-ring seals 140 provide a sliding seal between the cap 138 and the side wall 74 of the inside body 46 to exclude dirt and contaminants from the interior of the motion stabilizer 120. Another cap 142 is threaded onto the opposite end of the tube 134 to form the end wall 58. The attachment member 40 is a threaded shank of a screw held to the cap 142 by a nut 144.

FIGS. 17 and 18 illustrate details of construction of the inside body 46. The side wall 74 is formed by a tube 146 having a closed end 148. Spacer segment 70 is a tube 150 closed at both ends, and an added spacer disk 152 is interposed between the end of tube 150 and the closed end 148 of tube 146. Attachment member 42 is the threaded shank of a screw held to the closed end 148 by a nut 154. The radially outwardly extending collar 76 is provided by two arcuate flange portions 156. The collar 76 is interrupted by two arcuate gaps 158 (FIG. 18) that slideably receive the axially extending body portions 84 of the inner force transfer body 48.

Figure 23:
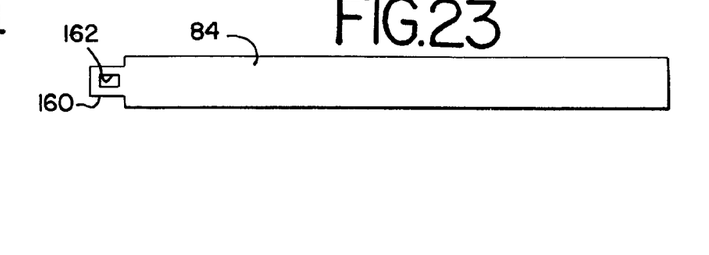
FIG. 23 is an elevational view of a force transfer bar of the force transfer body of FIG. 19.
Figure 24:
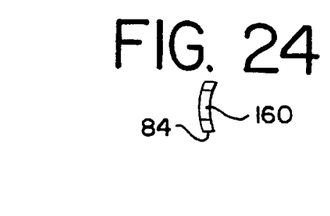
FIG. 24 is an end view of the force transfer bar of FIG. 23.

FIGS. 19–24 illustrate details of construction of the inner force transfer body 48. The axially extending body portions 84 are force transfer bars, one of which is seen in FIGS. 23 and 24. The bar 84 has an arcuate shape (FIG. 24) and one end of the bar 84 includes a tab portion 160 with an aperture 162. The ends of the bars 84 opposite the tabs 160 are secured to a pair of chord members 164 cooperating with the bar ends to form the collar 88. The end wall 68 is provided by a disc having holes receiving the tabs 160. The tabs are secured by keepers 166 (FIG. 22) held in place by spring retention clips 168.

Supplementing the description of the operation of the motion stabilizer 120, the inner force transfer body 48 slides within the outside body 44. The bars 84 slideably extend through the apertures 132 (FIG. 15) to permit movement of the inner force transfer assembly 48 relative to the reaction unit 52 (compare FIGS. 10 and 11). The bars 84 slideably extend through the gaps 158 (FIG. 18) in the collar 76 of the inside body 46, and the collar 76 abuts the collar 88 of the inner force transfer body 48 to permit the inside body to act through the inner force transfer body 48 and retract the reaction unit 52 as the motion stabilizer extends in length from the normal position of FIG. 10 to the extended position of FIG. 11. Simultaneously, the disk 130 extends radially out through the axially extending openings 86 defined between the bars 84 to engage the drive shoulder 66 of the tube 136. Sliding motion of the bars 84 through the apertures 132 in the disk 132 and through the gaps 158 in the collar 76 permit the motion stabilizer to move from the normal position of FIG. 10 to the retracted position of FIG. 12.

FIG. 13 illustrates an alternative construction of the motion stabilizer 120 wherein slack or preload is adjustable. In this arrangement, a spacer ring 170 is secured to the inside of the end cap 142 to provide clearance. An adjustment screw 172 extends through the end wall disk 78. The screw 172 can be threaded in or out to adjust the spacing between the disk end wall 78 and the bumper 80. For example, the screw 172 may be withdrawn to provide a gap between the end of the screw mechanism and the bumper 80. In this case, the gap permits a small range of free motion or slack around the normal or centered position. Alternatively, the screw 172 may be extended to force the stem 56 into the housing 54 of the reaction unit 52. This provides a preload and the initial reactive force is increased as the reaction unit 52 is moved from the normal or centered position.

Figure 25:
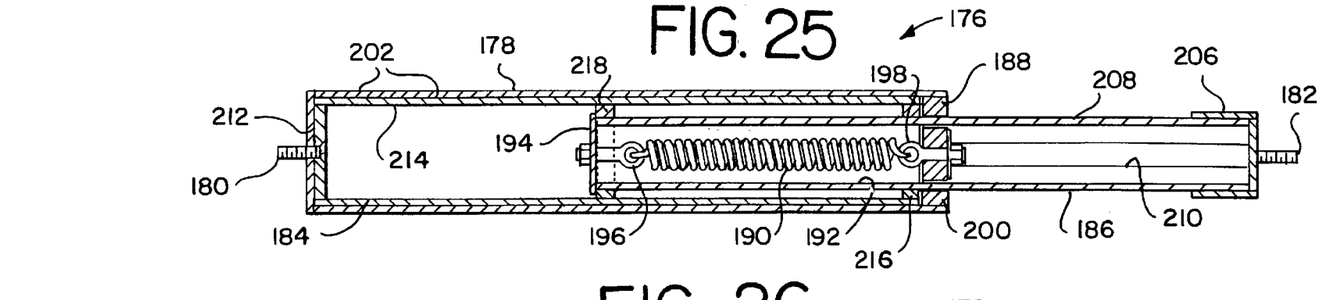
FIG. 25 is an axial sectional view of an alternative motion stabilizer constructed in accordance with the invention.

Another embodiment of the invention using an expansion spring is shown in FIGS. 25–28. A motion stabilizer 176 includes a body 178 having attachment members 180 and 182 at opposed ends for attachment to relatively movable loads. An outside body 184 is axially slidable relative to an inner body 186 in order to vary the length of the motion stabilizer 176, either shortening it (FIG. 26) or lengthening it (FIG. 27) relative to a normal or centered position (FIG. 25). A reaction unit 188 including a coil extension spring 190 is contained within an internal chamber 192 defined within the body 178. When the body 178 is either lengthened or shortened by relative motion of loads attached to the members 180 and 182, the telescoping components of the body 178 act to stretch the coil spring 190, thereby producing a reaction force urging the body 178 to return to its normal or centered position.

The reaction unit 188 includes an end plate 194 supporting an eye bolt 196 connected to one end of the spring 190. The other end of the spring 190 is connected to an eye bolt 198 carried by a radially outwardly extending disk member 200. An outer sealing tube 202 is secured to the outer periphery of the disk member 200. The disk member 200 is provided with arcuate openings 204 (FIG. 28) to permit sliding motion of the inner body 186.

The inner body 186 includes an end cap 206 secured to a tube 208 serving as a side wall of the inner body 186. The attachment member 182 takes the form of a screw threaded through the end cap 206. Elongated axially extending openings 210 are formed in the tube 208. The axially extending portions of the tube 208 between the openings 210 are slideably received in the arcuate openings 204, and the portions of the disk 200 between the arcuate openings 204 extend radially outward through the axially extending openings 210.

The outside body 184 includes an end cap 212 carrying the attachment member 180 in the form of a screw. The end cap 212 is threaded into the end of a tube 214 forming a side wall of the outside body 184. The opposite end of the tube 214 is provided with an internal collar 216 that slideably receives the side wall tube 208 of the inner body 186. A drive collar 218 is secured intermediate the ends of the side wall tube 214 of the outside body 184.

In the normal or centered position of the motion stabilizer 176 seen in FIG. 25, the spring 190 is retracted, and preferably is in tension to provide an initial preload. The end plate 194 contacts the drive collar 218 and the open end of the outer sealing tube 202 contacts the end cap 212 of the outside body 184. These points of contact of the reaction unit 188 with the outside body establish the normal or centered position of the motion stabilizer 176.

Figure 26:
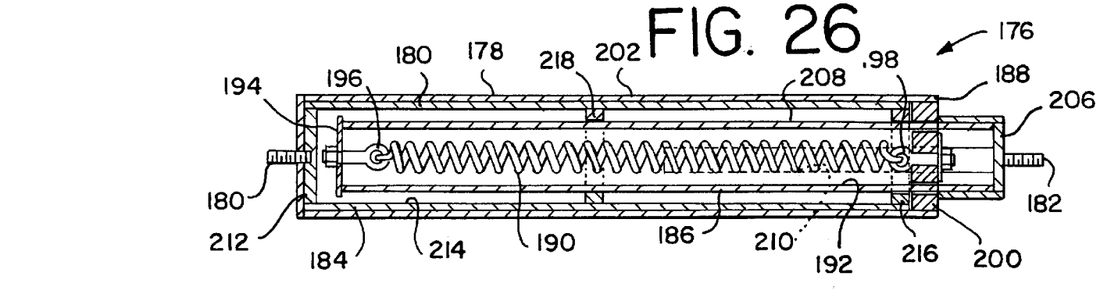
FIG. 26 is a view similar to FIG. 25 showing the motion stabilizer of FIG. 25 in a retracted position.

When the motion stabilizer 176 is shortened from the normal position of FIG. 25 toward the retracted position of FIG. 26, the end of the side wall tube 208 applies a force to the end plate 194 of the reaction unit 188. Simultaneously the end cap 212 of the outside body 184 applies an equal and opposite force to the end of the outer sealing tube 202 of the reaction unit 188. This force is transmitted through the disk 200 which extends radially outward through the axially extending openings 210 in the side wall tube 208 of the inner body 186. As a result, the spring 190 is extended and the force stored in the spring 190 applies a reactive force tending to return the motion stabilizer 176 to the normal position.

Figure 27:
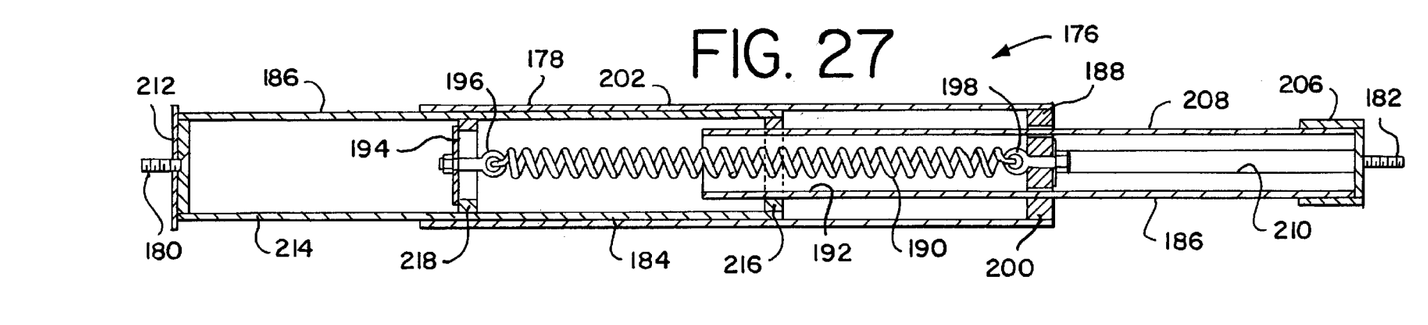
FIG. 27 is a view similar to FIG. 25 showing the motion stabilizer of FIG. 25 in an extended position.
Figure 28:
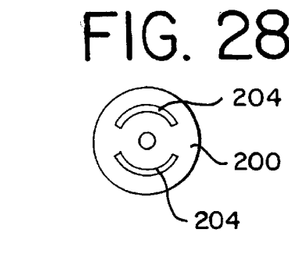
FIG. 28 is an elevational view of the force transfer disc of the motion stabilizer of FIGS. 25–27.

When the motion stabilizer 176 is lengthened from the normal position of FIG. 25 toward the extended position of FIG. 27, the drive collar 218 of the outside body 184 applies a force to the end plate 194 of the reaction unit 188. Simultaneously the portions of the side wall tube 208 at the ends of the axially extending openings 210 apply an equal and opposite force to the radially outwardly extending disk 200 of the reaction unit 188. As a result, the spring 190 is extended and the force stored in the spring 190 applies a reactive force tending to return the motion stabilizer 176 to the normal or centered position.

Other spring types, such as a gas spring, could be used in the compression type reaction unit 188 of the motion stabilizer 176. In addition damping could be used to augment or in place of the compression or tension type spring.

A reactive force is provided by spring extension whether the motion stabilizer 176 extends or retracts from the normal or centered position. The stroke of the reaction unit 188 is effectively doubled because the range of motion is effective twice the stroke of the reaction unit alone. The unobstructed internal chamber permits the use of a variety of reaction units having characteristics matched to many different applications.

While the present invention has been described with reference to the details of the embodiments of the invention shown in the drawing, these details are not intended to limit the scope of the invention as claimed in the appended claims.

What is claimed is:

1. A motion stabilizer for controlling motion between first and second relatively movable load members, the motion stabilizer comprising:

an elongated body assembly defining an axially extending internal chamber, the body assembly including axially spaced first and second attachment members for connection to the load members;

a reaction unit captured within the chamber and having an axial length that varies between first and second lengths;

the body assembly having an axial length variable in response to relative motion of the attachment members;

the body assembly having a normal position in which the reaction unit has the first length and in which the attachment structures are separated by a predetermined distance, the body assembly including means for varying the axial length of the reaction unit from the first length toward the second length in response to relative axial movement of the attachment structures in either axial direction from said normal position;

the body assembly including at least a radially inner body member and a radially outer telescoped body member, the body members being axially movable relative to one another, the radially inner body member defining at least part of the chamber and having a first force transfer portion engageable with the reaction unit;

the inner body member including an elongated axial opening proving access from the chamber to the radially outer body member; and the reaction unit including a second force transfer portion extending radially from the chamber through the axial opening for engagement with the radially outer body member.

2. A motion stabilizer as claimed in claim 1, the reaction unit comprising a spring.

3. A motion stabilizer as claimed in claim 2, the spring comprising a gas spring.

4. A motion stabilizer as claimed in claim 2, the spring comprising a coil spring.

5. A motion stabilizer as claimed in claim 2, the spring comprising an elastomeric spring.

6. A motion stabilizer as claimed in claim 2, the spring comprising a compression spring and the first length being larger than the second length.

7. A motion stabilizer as claimed in claim 2, the spring comprising an extension spring and the first length being smaller than the second length.

8. A motion stabilizer as claimed in claim 1, the reaction unit comprising a damper.

9. A motion stabilizer as claimed in claim 1, the reaction unit comprising a spring and a damper.

10. A motion stabilizer as claimed in claim 1, said reaction unit having a plurality of spaced force application points that move relative to one another to cause the axial length of the reaction unit to vary, said second force transfer portion comprising a first of said force application points.

11. A motion stabilizer for biasing a relatively movable load member to a normal position relative to a relatively fixed load member, the motion stabilizer comprising;

a body having a central longitudinal axis and including inner and outer axially elongated telescoped body members, said body having a normal length;

a pair of attachment members at opposite ends of said body for attachment of said body to the load members;

said body lengthening and shortening from said normal length in response to relative movement of the load members away from and toward one another;

said inner and outer body members defining an unobstructed axially extending internal chamber within said inner and outer body members and coinciding with and including said central longitudinal axis;

a reaction unit having an initial axial length and a compressed length in which stored energy applies a reactive force tending to return said reaction unit to said initial length;

said reaction unit being mounted within said internal chamber, and said body including means for moving said reaction member from said initial length toward said compressed length in response to both lengthening and shortening of said body.

12. A motion stabilizer as claimed in claim 11, said reaction unit including a spring.

13. A motion stabilizer as claimed in claim 12, said reaction unit including a damper.

14. A motion stabilizer as claimed in claim 12 said spring comprising a gas spring.

15. A motion stabilizer for biasing a relatively movable load member to a normal position relative to a relatively fixed load member, the motion stabilizer comprising;

a body having a central longitudinal axis and including inner and outer axially elongated telescoped body members, said body having a normal length;

a pair of attachment members at opposite ends of said body for attachment of said body to the load members;

said body lengthening and shortening from said normal length in response to relative movement of the load members away from and toward one another;

said inner and outer body members defining an unobstructed axially extending internal chamber within said inner and outer body members and coinciding with and including said central longitudinal axis;

a reaction unit having an initial axial length and an extended length in which stored energy applies a reactive force tending to return said reaction unit to said initial length;

said reaction unit being mounted within said internal chamber; and said body including means for moving said reaction member from said initial length toward said extended length in response to both lengthening and shortening of said body.

16. A motion stabilizer as claimed in claim 15, said reaction member including a coil extension spring.

\* \* \* \* \*